(12) United States Patent
Boutoussov

(10) Patent No.: US 6,449,294 B1
(45) Date of Patent: Sep. 10, 2002

(54) SINGLE DOMINANT SPIKE OUTPUT ERBIUM LASER

(75) Inventor: Dmitri Boutoussov, Dana Point, CA (US)

(73) Assignee: PLS Liquidating LLC, Costa Mesa, CA (US)

( * ) Notice: Subject to any disclaimer, the term of this patent is extended or adjusted under 35 U.S.C. 154(b) by 0 days.

(21) Appl. No.: 09/360,588

(22) Filed: Jul. 26, 1999

(51) Int. Cl.⁷ .................................................. H01S 3/10
(52) U.S. Cl. ........................................................ 372/25
(58) Field of Search ................................... 372/25, 70

(56) References Cited

U.S. PATENT DOCUMENTS

| | | |
|---|---|---|
| 5,422,899 A | 6/1995 | Freiberg et al. |
| 5,557,624 A | 9/1996 | Stultz et al. |
| 5,642,370 A | 6/1997 | Mitchell et al. |
| 5,644,585 A | 7/1997 | Mitchell et al. |
| 5,724,372 A | 3/1998 | Stultz et al. |
| 5,741,245 A | 4/1998 | Cozean et al. |

OTHER PUBLICATIONS

Volger, Klaus et al, Improved Erbium Laser Parameters, Biophotonics International, dated: Nov./Dec. 1996, pp. 40–47.

Brochure: Coherent, VersaPulse Select Erbium for Vitreoretinal Surgery, dated: 1994, two pages (No month).

Brochure: Wavelight Laser Technologie GmbH, Phaco PRK, circa Fall 1996, three pages (No month).

Zeck, M. et al Scanning ablation of dental hard tissue with Erbium laser radiation, SPIE, dated: 1994 vol. 2623, nine pages (No month).

*Primary Examiner*—James Davie
(74) *Attorney, Agent, or Firm*—Knobbe, Martens, Olson & Bear, LLP

(57) ABSTRACT

A non Q-switched erbium laser operating on the $I_{11/2} \rightarrow I_{13/2}$ transition produces laser output pulses characterized by a single spike containing approximately 90% of the energy, rather than a series of multiple spikes. The laser includes an optical gain medium with erbium being the lasing species, such as an erbium doped YAG rod. The gain medium is pumped with a flashlamp, with the voltage applied to the flashlamp and the duration of the applied voltage being carefully controlled to produce the single spike laser output. Depending upon the operating conditions, the full width half maximum (FWHM) of the spikes can be varied between 0.1 and 10 microseconds. The output of the erbium has fewer than 10 transverse modes. Output from the erbium laser may be directed onto corneal tissue in a preferred corneal sculpting procedure, in which the ablation rate is limited to no more than about 3 microns per laser pulse.

39 Claims, 6 Drawing Sheets

SINGLE DOMINANT SPIKE OUTPUT ERBIUM LASER

BACKGROUND OF THE INVENTION

1. Field of the Invention

The present invention relates generally to lasers, and more particularly, lasers emitting in the mid-infrared portion of the optical spectrum.

2. Description of the Related Art

Erbium lasers in the infrared near 2.9 microns may operate in either a Q-switched mode or in a free running (non-Q-switched) mode. The pulse duration at full width half maximum (FWHM) for erbium Q-switched laser pulses is generally in the range of 0.05–0.2 microseconds, which is short enough that a large acoustic effect may be generated. Such acoustic effects may be undesirable, depending on the target material. For example, acoustic effects in medical applications can lead to tearing of the affected tissue and/or adjacent tissues. On the other hand, the pulse duration at FWHM for free running, non Q-switched erbium lasers is generally in the range of 100–350 microseconds. Such a duration may be longer than optimal in some cases. For example, pulses longer than the thermal relaxation time (e.g., 10 microseconds) of certain human tissues can lead to unwanted thermal damage.

Although free running erbium lasers are quite effective at cutting materials having a high water content, such as tissue, one characteristic of such lasers impairs the cutting efficiency. As is well known, the output from a free running erbium laser is characteristically in the form of a series of intensity "spikes," the maxima of which form an envelope that defines the laser output pulse. During tissue ablation, it is typical that the maxima of the spikes fall above, and the minima below, the ablation threshold of the tissue in question. Since ablation (cutting) occurs only above the ablation threshold, the energy below the threshold is wasted and results in undesirable heating of the tissue. Thus, there is need for an infrared laser which ablates tissue without causing either substantial collateral damage or acoustic damage to the tissue. To this end, it would be desirable to provide an erbium laser that emits laser pulses with a duration between that for Q-switched lasers and free running lasers.

SUMMARY OF THE INVENTION

According to one embodiment of the invention, a non-Q-switched laser that produces a series of laser output pulses includes a laser resonator, in which the resonator comprises a solid state optical gain medium for the wavelength range of 2.5 to 5.0 microns. The laser further includes an optical pump source that produces a plurality of pulses of optical radiation for pumping the gain medium, in which the pump pulses have an intensity and duration such that each of the pump pulses produces a respective laser output pulse comprising a dominant spike that contains at least a significant majority of the laser output pulse energy generated by its respective pump pulse, and preferably substantially all of such output energy. Each of the respective laser output pulses is separated from an adjacent laser output pulse by a time substantially equal to the time between pump pulses. In a preferred embodiment of the invention, the laser operates on the $I_{11/2} \rightarrow I_{13/2}$ transition in erbium. In one preferred embodiment of the invention, substantially all of the laser output pulse energy is contained in the dominant spike. In a preferred embodiment of the invention, greater than approximately 90% of the energy of the laser output pulse is concentrated within the dominant spike.

According to another aspect of the invention, an erbium laser includes a laser resonator, with the resonator comprising a solid state optical gain medium, and the gain medium including erbium as a laser ion. The erbium laser further includes an optical pump source that generates a plurality of pulses of optical radiation for pumping the gain medium and producing laser output pulses, in which the pump pulses have an intensity and duration such that each of the laser output pulses has a full width half maximum (FWHM) of between 0.4 and 3 microseconds, and wherein each of the pulses is separated from an adjacent pulse by a time substantially equal to the time between pump pulses. In a preferred embodiment of the invention, the gain medium comprises a solid state host selected from the group consisting of YAG, YLF, YSGG, and YAP, and the laser output pulses from the laser have a wavelength near 2.9 microns. In a preferred embodiment, the optical pump source comprises a flashlamp, in which a voltage is applied to the flashlamp for a given duration, with the voltage and the duration thereof controlling the temporal behavior of the laser output pulses.

Another aspect of the invention comprises a method of generating laser pulses, in which the method includes providing a laser resonator that includes a solid state optical gain medium for the wavelength range of 1.9 to 5.0 microns, pumping the gain medium with pulses of optical radiation to optically excite ions in the gain medium, and generating optical feedback to create laser output pulses, in which the intensity and duration of the optical pump pulses is such that the laser output pulses have a FWHM of between 0.4 and 3 microseconds, and wherein each of the pulses is separated from an adjacent pulse by a time substantially equal to the time between pump pulses.

According to yet another aspect of the invention, a laser includes a non-Q-switched laser resonator, with the resonator comprising a solid state optical gain medium for the wavelength range of 1.9 to 5.0 microns. The laser further comprises an optical pump source that generates a plurality of pulses of optical radiation for pumping the gain medium and producing laser output pulses, in which the pump pulses have an intensity and duration such that each of the laser output pulses has a FWHM of between 0.1 and 10 microseconds, and wherein each of the pulses is separated from an adjacent pulse by a time substantially equal to the time between pump pulses. In a preferred embodiment of the invention, the FWHM of the laser output pulses is between 0.2 and 0.5 microseconds. In another preferred embodiment, the FWHM of the laser output pulses is between 0.1 and 0.3 microseconds.

According to still another aspect of the invention, an erbium laser includes a laser resonator, in which the resonator comprises a solid state optical gain medium for providing optical feedback, with the gain medium including erbium as a laser ion. The erbium laser further includes an optical pump source that produces a plurality of pulses of optical radiation for pumping the gain medium, in which the pump pulses have an intensity and duration such that the erbium laser produces laser output pulses having fewer than 10 transverse modes. In one preferred embodiment of the invention, the laser output pulses have fewer than 5 transverse modes.

Another aspect of the invention comprises a method of generating erbium laser pulses that includes providing a laser resonator having an optical gain medium for the wavelength range of 1.9 to 5.0 microns, pumping the gain medium with pulses of optical radiation to optically excite erbium ions in the gain medium, and generating optical feedback to create laser output pulses, in which the intensity and duration of the optical pump pulses is such that each of the laser output pulses comprises several dominant spikes having intensities of the same order of magnitude, wherein the number of spikes is no greater than 5 and the pulses have a FWHM of between 0.4 and 20 microseconds, and wherein each of the pulses is separated from an adjacent pulse by a time substantially equal to the time between pump pulses.

According to yet another aspect of the invention, a non-Q-switched laser that produces a series of laser output pulses includes a laser resonator, in which the resonator comprises an optical gain medium that includes erbium as a laser ion in a solid state host. The laser further includes an optical pump source that produces a plurality of pulses of optical radiation for pumping the gain medium. The pump pulses have an intensity and duration such that each of the pump pulses produces a respective laser output pulse having rise and fall times of 1 microsecond or less, and wherein each of the respective laser output pulses is separated from an adjacent laser output pulse by a time substantially equal to the time between pump pulses. The laser output pulses may advantageously have a wavelength on the order of 3 microns.

Another aspect of the invention comprises a method of corneal sculpting that includes directing a beam of infrared laser light having a wavelength of between 1.9 and 5.0 microns onto corneal tissue. The beam is supplied in the form of pulses, each of which (a) has a peak energy density above the ablation threshold for the corneal tissue but whose energy density is sufficiently low to limit the ablation rate to no more than about 3 microns per pulse, (b) has a pulse duration whose full width half maximum (FWHM) is greater than about 300 nsec and is less than the thermal relaxation time of untreated corneal tissue, and (c) has a rise time and a fall time which are both less than 10 microseconds. The method further comprises ablating a surface of the corneal tissue using the laser light, whereby no substantial tissue damage occurs more than 30 microns below the ablated surface.

DETAILED DESCRIPTION OF THE PREFERRED EMBODIMENT

Figure 1:
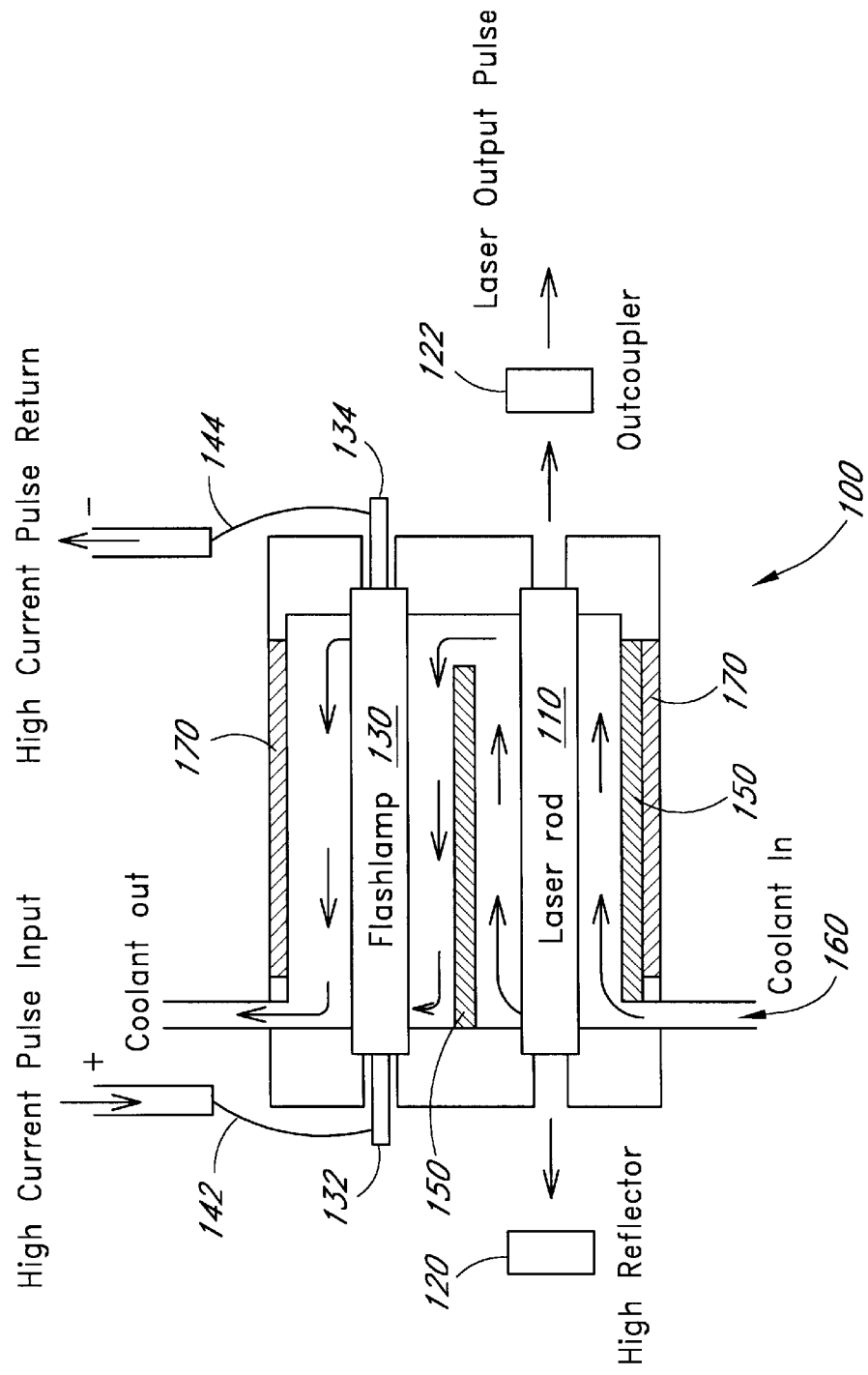
FIG. 1 is a schematic of one representation of the invention, in which the applied voltage and the duration of the applied voltage are controlled to produce erbium laser output which is characterized by a single spike.

One aspect of the invention comprises a laser operating in the mid-infrared (IR) region of the optical spectrum (1.9–5.0 microns) that produces an optical output characterized by a pulse in the form of a dominant spike that contains substantially all of the pulse energy. As shown in FIG. 1, an erbium laser 100 includes a laser resonator comprising an optical gain medium 110 and two reflectors 120, 122 that provide optical feedback through the optical gain medium 110. An optical pump source 130 pumps the optical gain medium 110, which is preferably an Er:YAG laser rod.

In general, the length of laser rod 110 may be in the range of 80–120 mm or even 10–250 mm, although the length is preferably less than about 150 mm. For the results presented herein, the laser rod 110 was a 4 mm diameter×105 mm long cylindrical Er:YAG rod made by Litton Airtron of Charlotte, N.C. The erbium lasing wavelength corresponds to the $I_{11/2} \rightarrow I_{13/2}$ transition, which for a YAG host is near 2.9 microns. In addition to YAG, other host materials for erbium may be used to generate optical output near 3 microns, such as YLF, YSGG, YALO, and YAP, which yield erbium lines at 2.84, 2.79, and 2.73, microns, respectively. Other laser materials, such as a 50% substitution of yttrium with erbium in a YAG host may also yield satisfactory single dominant spike behavior.

The optical pump source 130 of the preferred embodiment was a 450 torr, 6 mm diameter, 140 mm long xenon flashlamp with $k_o$=26 made by Fenix Technology of Phoenix, Ariz. In general, the flashlamp 130 may have a diameter in the range of 2–10 mm and a length in the range of 10–400 mm. Alternatively, laser diodes or other pumping sources may be used to optically excite the erbium ions in the optical gain medium 110.

The Xenon flashlamp 130 has two electrodes 132, 134 which are preferably separated by 9 cm (for the crystal length of 10.5 cm) and are connected to high current pulse input and return lines 142, 144, respectively, for energizing the xenon gas. The flashlamp 130 is connected to a power supply such as Analog Modules Laser Controller Model # 8800V-2-1-10-1000-SS-D, which can supply up to 1200 volts and 2.5 kW of power. For this embodiment, the power supply was modified to provide a pulse duration (at full width half maximum) of 20–800 microseconds at a repetition rate of 1–100 Hz. The pump pulses had sufficiently fast rise and fall times to prevent significant thermal lensing as discussed in U.S. Pat. No. 5,422,899 to Freiberg et al., which is hereby incorporated by reference. The laser rod 110 is preferably surrounded by a pyrex flow tube 150 through which coolant 160 such as water flows. At a repetition rate of 30 Hz, the preferred water flow rate was 0.8 gallon/minute at 20 psi and 30–35° C. The flow tube 150 is in turn preferably surrounded by a spectrally diffuse pump reflector 170 which is elliptical in cross section, so that energy from the flashlamp 130 is efficiently coupled (with a soft focus) into the laser rod 110. By way of example, the pump reflector 170 may be elliptical in cross section. The pump reflector 170 acts to contain the coolant 160 which cools the flashlamp 130 as well as the laser rod 110.

The reflectors 120, 122 and the pump reflector 170 containing the laser rod 110 are preferably mounted on an optical rail (not shown) for ease of alignment and to maintain the alignment once it has been optimized. The reflectors 120, 122 preferably comprise a highly reflective mirror and a partially reflective output coupler, respectively, which are optically aligned with the laser rod 110 to extract energy from the erbium laser ions which are optically excited by the flashlamp 130. For the data presented herein, the reflector 120 was a plano/plano ZnSe optic coated for high reflectivity at 2.94 microns, and the reflector 122 was a plano/plano ZnSe optic coated for 82% reflectivity at 2.94 microns, with these optics being available from Rocky Mountain Instruments of Longmont, Colo. Further, the reflectors 120 and 122 were separated from the laser rod 110 by about 12.1 cm and 3.2 cm, respectively, for a reflector to reflector distance of about 25.8 cm. Preferably, the distance between the reflectors 120, 122 is in the range of 18 to 40 cm. Other optical components may be substituted for the reflector 120, such as a convex optic with a radius of curvature of 0.8 m, as well as a concave optic with a radius of curvature of 1.5 m. Additionally, the reflectivity of the reflector 122 may be varied. By way of example, single, dominant spike behavior was obtained when the reflectivity of reflector 122 was 75% or 90%. While the embodiment disclosed utilizes reflectors 120, 122 formed as discrete components, one or both of the reflectors 120, 122 can be integrated onto the laser rod 110 itself by applying coatings to one or both ends of the laser rod. The laser resonator described herein had an uninterrupted feedback path between the reflectors 120, 122. In other words, no Q-switching elements were employed to interrupt optical feedback.

For the embodiment of FIG. 1, certain voltages and durations of the voltage applied to the flashlamp 130 led to a laser output behavior which was uncharacteristic of non-Q-switched (e.g., free running) erbium lasers. In particular, each of the output pulses were in the form of a dominant (primary) laser output spike which accounted for the preponderance of the energy in the laser pulse. This is to be contrasted with the conventional performance of a non-Q-switched erbium laser, in which a substantial number of laser spikes are generated each time the flashlamp 130 is pulsed. Although the multiple spikes of a conventional erbium laser pulse are not necessarily equal in magnitude, adjacent pulses will be of similar magnitude, and thus there is no one spike that is dominant.

Figure 2:
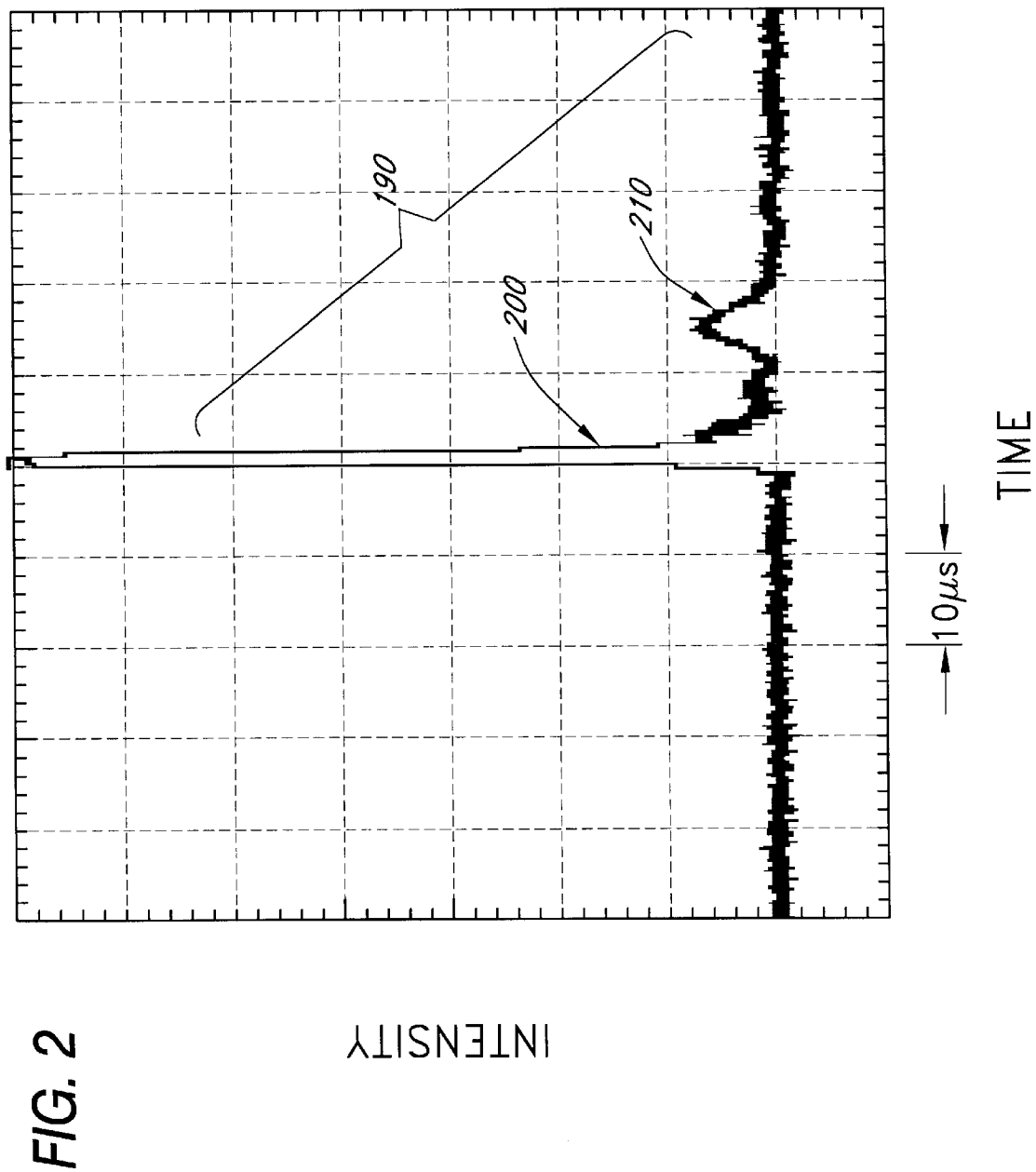
FIG. 2 shows a single one of the output pulses from the erbium laser of FIG. 1, in which the output pulse is dominated by a primary spike which contains most of the energy and is accompanied by a smaller, adjacent secondary spike.

FIG. 2 shows output of a single one of the pulses from the erbium laser 100 when the flashlamp is operated at a voltage of 500 V with a flashlamp pulsewidth of 72 microseconds. The energy of the laser output pulse 190 is concentrated in a dominant spike 200 which contains a significant majority (i.e., substantially more than a simple majority, but not necessarily all) of the energy in the laser output pulse. In the preferred embodiment, the dominant spike 200 accounts for at least 70–80%, and more preferably more than 90%, of the laser output energy generated in response to a single pulse of the flashlamp 130. In FIG. 2, the pulse 190 contains a much smaller secondary spike 210 which is generated about 10 microseconds after the large dominant spike 200. Accordingly, each output pulse from the erbium laser 100 may be characterized as a substantially single spike output pulse. Laser pulse output energies generally fall in the range of 0.5–50 mJ/pulse. Adjacent laser output pulses (and thus adjacent dominant spikes) will be separated from each other by approximately the time between pump pulses of the flashlamp. For FIG. 2, the flashlamp 130 operated at 30 Hz, although the flashlamp is preferably operated at a repetition rate between 5 and 100 Hz, e.g., greater than about 50 Hz.

Figure 3:
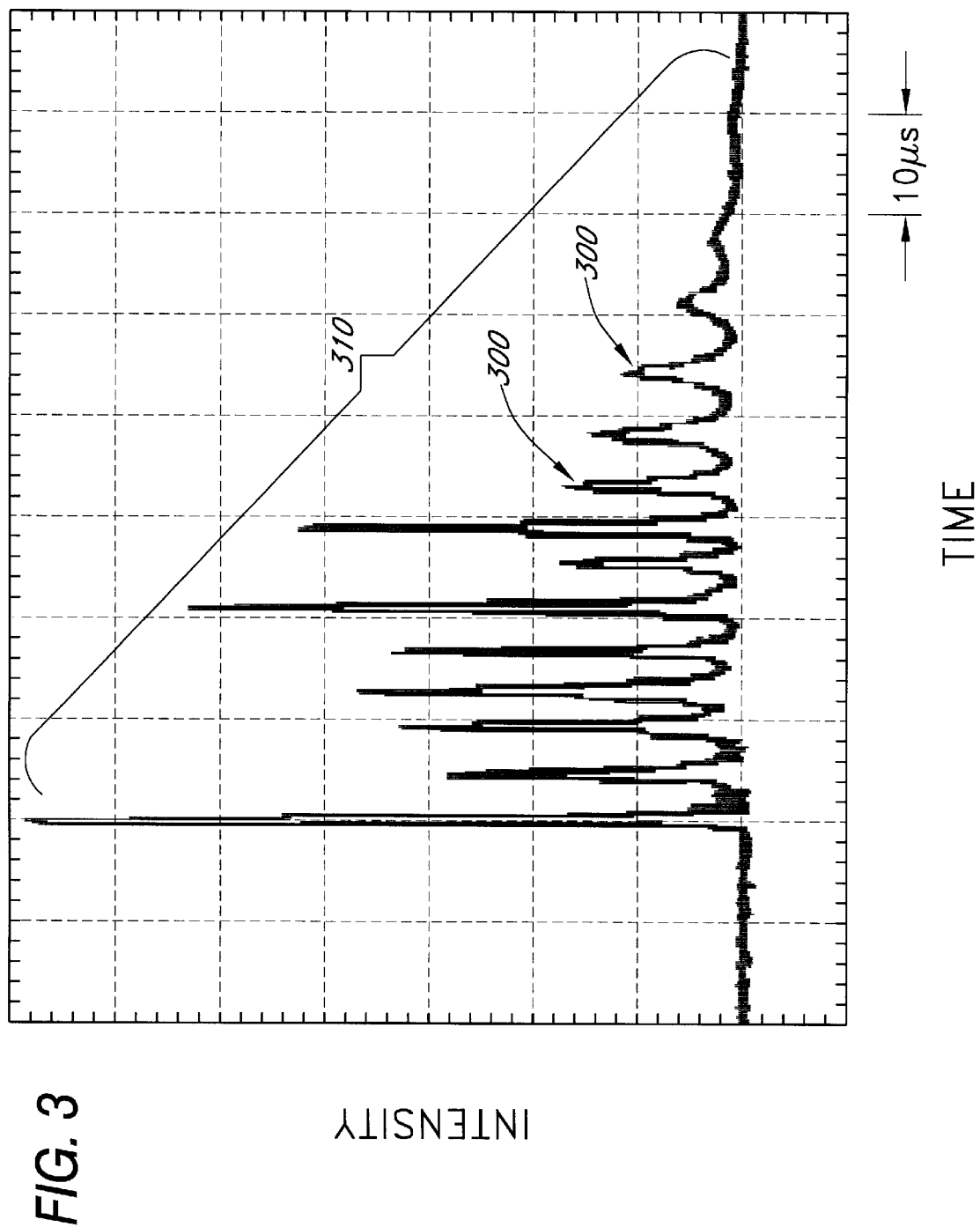
FIG. 3 illustrates output from an erbium laser that comprises a plurality of spikes, in contrast to the single dominant spike output of FIG. 2.
Figure 4:
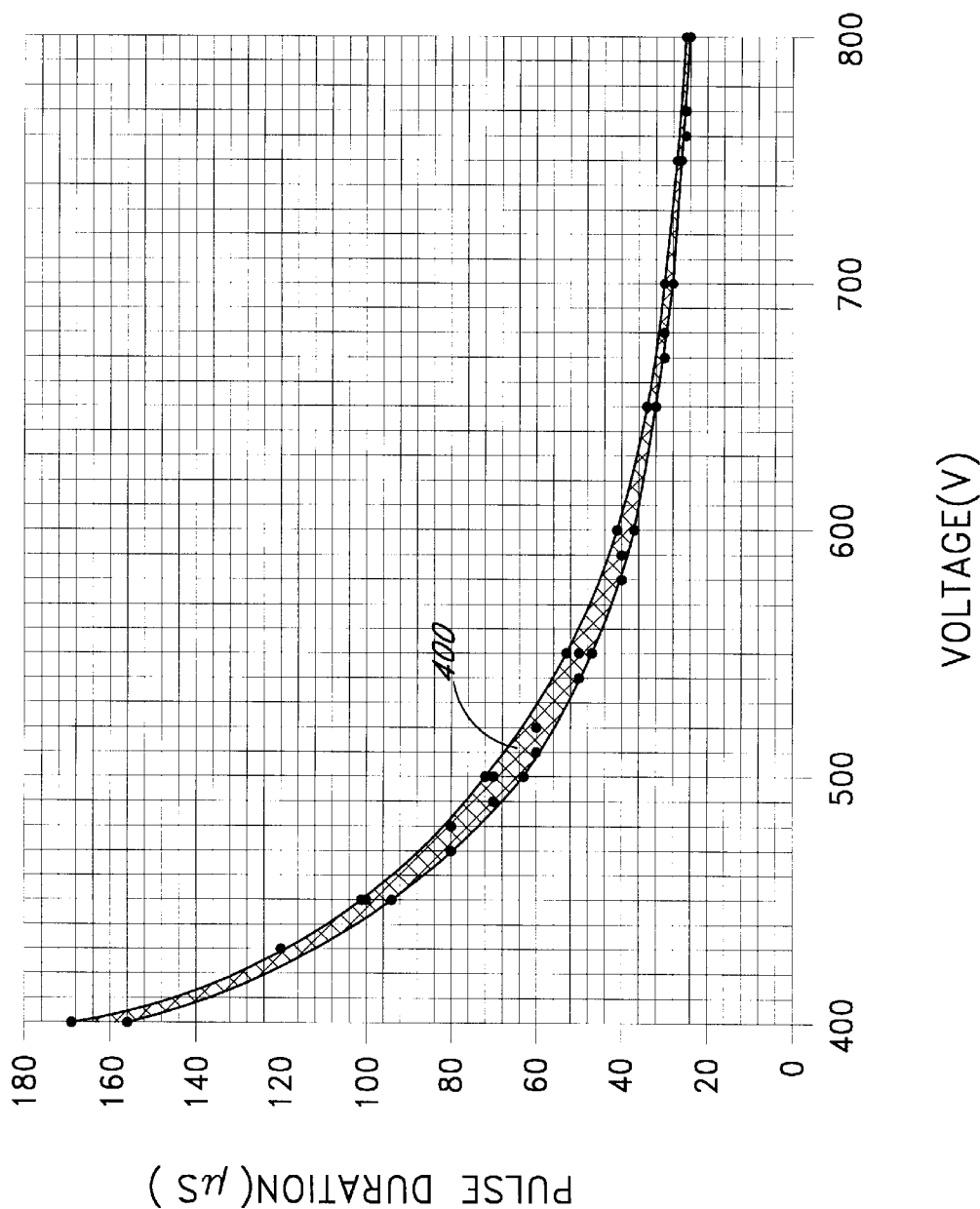
FIG. 4 shows the range (designated by the hatched region) of voltages and pulse durations (measured at FWHM) for which single dominant spike output is obtained from the erbium laser of FIG. 1.

The erbium laser 100 can be operated in a single spike regime by properly choosing the flashlamp voltage and flashlamp pulsewidth (i.e., by controlling the intensity and the duration of the pulses of optical radiation that pump the pump medium 110). This is illustrated in FIG. 4, in which the relatively narrow hatched region 400 represents those combinations of flashlamp voltages and pulse durations (measured at FWHM) leading to single dominant spike output like that shown in FIG. 2. When operating outside the region 400, at higher flashlamp voltages and longer pulse-widths (i.e., the region to the right of and above the hatched region 400), a plurality of laser spikes within each laser output pulse are observed like that shown in FIG. 3. Unlike the laser output of FIG. 2, the energy of the laser pulse 310 in FIG. 3 is not concentrated in a single laser spike with a dominant energy spike, but rather is distributed among several laser spikes 300. In FIG. 3, the laser pulse 310 was produced using a flashlamp voltage of 630 and a flashlamp pulsewidth of 79 microseconds, with the flashlamp being pulsed at 30 Hz. Operating at lower flashlamp voltages and shorter pulsewidths (i.e., the region to the left of and below the hatched region 400) leads to no lasing.

As suggested by FIG. 4, a small change in the voltage for a fixed pulse duration, or alternatively, a small change in the pulse duration for a fixed voltage, results in laser performance that is no longer characterized by single spike output. For the flashlamp operating conditions defined by the hatched region 400 of FIG. 4, however, a dominant laser output spike was observed. Thus, by varying the voltage and the pulse duration of the voltage applied to the flashlamp 130, the temporal behavior of the laser output pulses can be controlled. The region 400 may be determined empirically by first finding a flashlamp voltage and pulse duration leading to laser output pulses having a dominant laser spike. Then, either the voltage or the pulse duration is varied incrementally until either no lasing or a plurality of spikes are obtained. By controlling the pulse duration and voltage of the flashlamp, it is possible to access regimes of Er laser output pulse durations that have heretofore been unaccessible.

The dominant laser output spike 200 was found to have a full width half maximum (FWHM) between 0.1 and 10 microseconds. In general, a higher voltage and a shorter pulse duration results in a shorter FWHM of the laser output pulse. Depending on the operating conditions, this FWHM can be advantageously selected to be between 0.4 and 3 microseconds. Further, the number of transverse modes in the laser output pulse is relatively small, and may be no more than 10 or even 5.

There are applications for which a few dominant spikes, e.g., 2–5, are more desirable than either a single dominant spike or a large number of spikes, such as produced by a conventional erbium laser. The erbium laser may be operated to produce a plurality of spikes by increasing the voltage applied to the flashlamp to a point along the upper boundary of the region 400, just beyond the voltage corresponding to single dominant spike operation. This results in a laser output characterized by two dominant laser spikes, and as the applied voltage is increased further, three dominant laser spikes evolve, and so on, with the number of dominant laser spikes increasing with increasing voltage.

Figure 5:
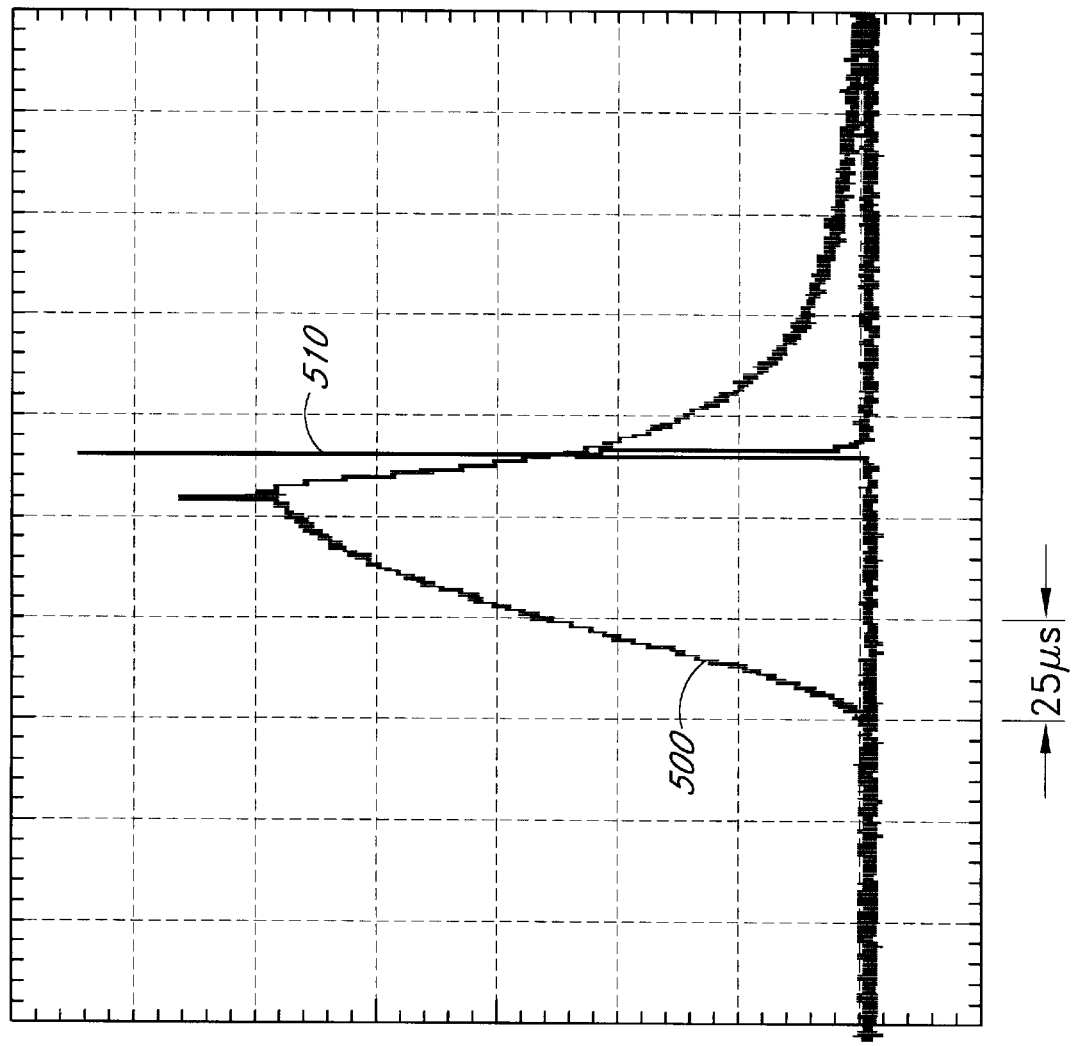
FIG. 5 illustrates the temporal relationship between output from the optical pump and output from the erbium laser, in which the laser output is characterized by single spike behavior.
Figure 6:
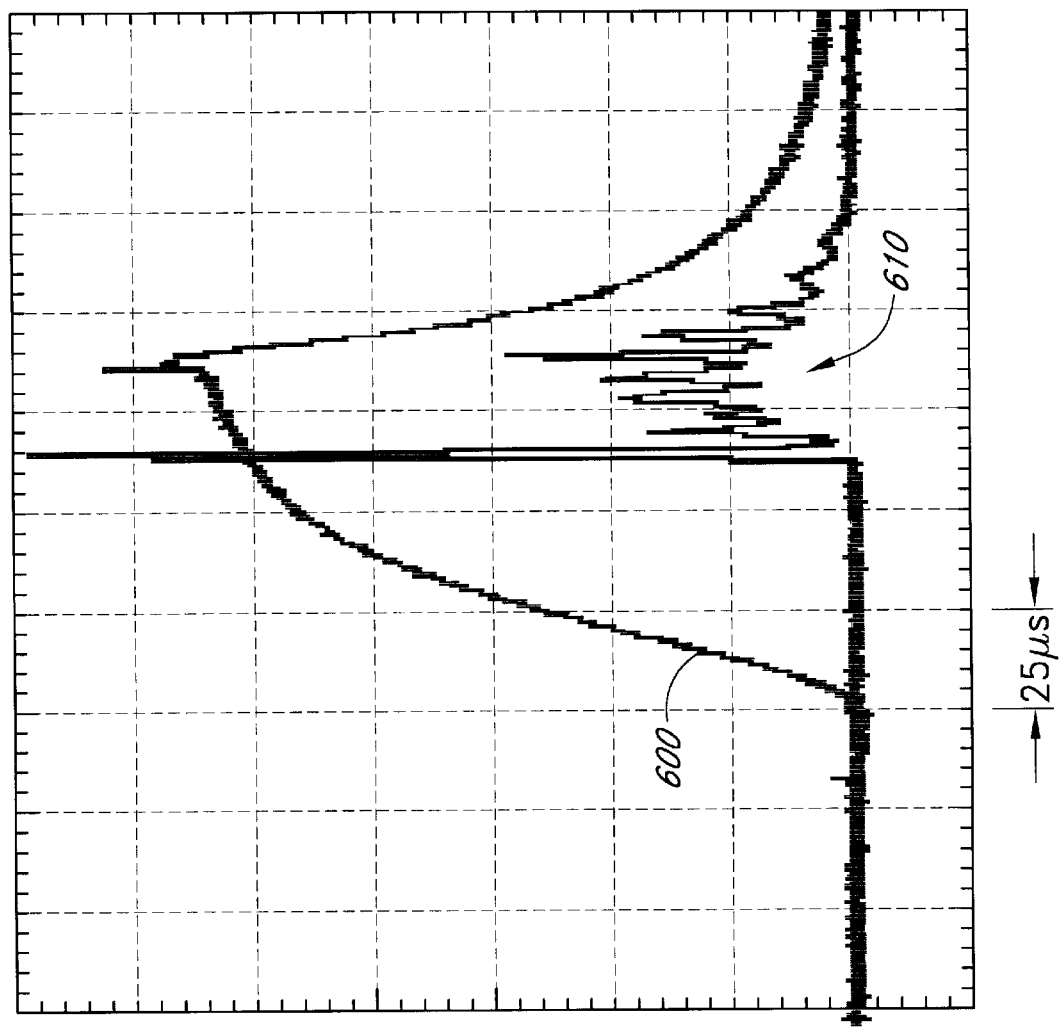
FIG. 6 illustrates the temporal relationship between output from the optical pump and output from the erbium laser, in which the laser output is characterized by several spike behavior.

The temporal relationship between the output of the flashlamp 130 and the output from the erbium laser 100 is illustrated in FIGS. 5 and 6. In FIG. 5, optical output 500 from the flashlamp 130 is shown in relation to an erbium laser pulse 510 that consists of a single, dominant laser spike. The flashlamp pulsewidth (FWHM) is approximately 50 microseconds and the flashlamp voltage is approximately 550 V, corresponding to operating conditions that fall within the hatched region 400 of FIG. 4. In FIG. 5, the flashlamp's optical output 500 reaches a maximum before laser output from the erbium laser 100 is generated.

FIG. 6 illustrates an optical output 600 from the flashlamp 130 in relation to an erbium laser pulse 610 that consists of several laser spikes. In this case, the pump output 600 peaks after the erbium laser 100 begins emitting laser emission. In general, it was found that if the output from the xenon flashlamp 130 reached a maximum after the erbium laser 100 began to lase, the erbium laser output consisted of a plurality of laser spikes. For many medical applications, such as the corneal sculpting procedure discussed below, it is preferable that the number of spikes not exceed five. Rare earth elements other than erbium emitting in the range 1.9–5.0 microns should, when placed in a solid state host and pumped optically as disclosed herein, exhibit laser output having temporal behavior that likewise depends on the magnitude and duration of the voltage applied to the flashlamp 130.

In the most preferred embodiments, the rise and fall times (measured with respect to 10% and 90% of peak power) of the laser spikes are well under 10 microseconds and are generally on the order of about 1 microsecond. Since the thermal dissipation (relaxation) time of untreated corneal tissue generally lies in the range of between 20 and 50 microseconds, the erbium laser disclosed herein may be advantageously used in corneal sculpting procedures, with less risk of inducing thermally induced damage in the corneal tissue. When used for corneal sculpting, the erbium laser is operated above the ablation threshold of corneal tissue, which, for a given cornea, generally lies between 0.5 and 1.0 J/cm². By operating the erbium laser just slightly above the ablation threshold, the amount of corneal tissue ablated per pulse may advantageously be kept to between about 2 and about 3 microns, thereby giving the user greater control over the smoothness of the ablated corneal surface.

In the single spike mode (cf. FIG. 2), the erbium laser may be advantageously operated to produce output characterized by pulse energies of between 5 and 30 mJ, a FWHM of between 0.2 (or 0.3) and 1 microsecond, a spot diameter of 0.7–1.5 mm, and a power density of 0.5–3.0 J/cm² (or 0.6–1.5 j/cm², a range which is above the ablation threshold of corneal tissue and corresponds to an ablation rate of approximately 2–3 microns/pulse). In the several spike mode (cf. FIG. 6), the erbium laser may be advantageously operated to produce output characterized by pulse energies of between 5 and 50 mJ, a FWHM of 1–50 microseconds, a spot diameter of 0.7–1.5 mm, and a power density of 0.5–5.0 J/cm² (or 0.6–1.5 J/cm² or 0.8–1.5 j/cm², ranges which are above the ablation threshold of corneal tissue and correspond to an ablation rate of approximately 2–3 microns/pulse).

The erbium laser herein can be operated to produce relatively little thermal damage while efficiently removing layers of corneal tissue. For example, single spike output from the erbium laser that is characterized by a power density of 0.6–1.5 J/cm² and a pulsewidth having a FWHM of about 1 microsecond may result in thermal damage (as determined by H&E staining, i.e. "hematoxylin and eosin") that extends to about 10 microns below the ablated surface, with substantially no tissue damage occurring more than 10 microns below the ablated surface. At shorter pulsewidths of about 0.2 (or 0.3)–1 microsecond, thermal damage may be kept to less than about 10 microns below the surface, e.g., to less than about 5 microns, with substantially no tissue damage occurring more than 5 microns below the ablated surface. At pulsewidths of about 10 microseconds, thermal damage may be kept to less than about 20 microns below the ablated surface, with substantially no tissue damage occurring more than about 20 microns below the ablated surface. At longer pulsewidths of about 20 microseconds, thermal damage may extend to about 30 microns below the ablated surface, with substantially no tissue damage occurring more than 30 microns below the ablated surface.

When the erbium laser is operated in the several spike mode with FWHM output of 50 microseconds and a power density of 0.6–1.5 J/cm² (or 0.8–1.5 J/cm²), thermal damage to the cornea may extend to 30 microns beneath the ablated surface, and at 250 microseconds up to about 200 microns beneath the ablated surface. Thus, for corneal sculpting procedures, the erbium laser is preferably operated in the single spike mode rather than in a several spike mode. Further, when the pulse has more than one spike, the ablation threshold of the corneal tissue may actually increase with each subsequent spike, since any particular spike may produce some thermal damage to the corneal tissue, which in turn raises the ablation threshold. The thermal damage induced by the erbium laser of the preferred embodiments is in general reversible.

Many of the advantages of the erbium laser disclosed herein (such as reduced thermal damage, limited cutting depth per pulse, and a smooth corneal surface following ablation) may be enhanced by delivering water to the corneal surface during ablation. By directing the erbium laser output onto a thin layer of water on the cornea (e.g., a film of water having a thickness between 5 and 50 microns), microexplosions are induced that dislodge and propel tissue away from the surface of the cornea, as discussed in U.S. Pat. No. 5,741,245 to Cozean et al., which is hereby incorporated by reference herein. In this technique, laser energy is absorbed mainly in the water layer on the surface of the cornea rather than in the cornea itself, resulting in less ablated tissue per pulse, and less thermal damage to the corneal tissue. Further, use of a thin layer of water on the cornea enhances the smoothness of the ablated surface, since any regions of the cornea that are higher in elevation ("peaks") are covered by a thinner layer of water than those regions that are lower in elevation ("valleys"), with the result that the peaks experience greater ablation than the valleys. (Peaks and valleys in the corneal surface may be formed, for example, when a laser having a gaussian beam profile is scanned across the cornea.)

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

What is claimed is:

1. A non-Q-switched laser producing a series of laser output pulses, comprising:

a laser resonator, said resonator comprising a solid state optical gain medium for the wavelength range of 2.5 to 5.0 microns; and an optical pump source that produces a plurality of pulses of optical radiation for pumping said gain medium, the pump pulses having an intensity and duration such that each of the pump pulses produces a respective laser output pulse comprising a dominant spike that contains at least a significant majority of the laser output pulse energy generated by its respective pump pulse, and wherein each of the respective laser output pulses is separated from an adjacent laser output pulse by a time substantially equal to the time between pump pulses.

2. The laser of claim 1, wherein said gain medium includes erbium as a laser ion.

3. The erbium laser of claim 2, wherein said laser operates on the $I_{11/2} \rightarrow I_{13/2}$ transition.

4. The erbium laser of claim 3, wherein the dominant spike contains substantially all of the laser output pulse energy.

5. The erbium laser of claim 4, wherein greater than approximately 90% of the energy of the laser output pulse is concentrated within the dominant spike.

6. The erbium laser of claim 5, wherein output from said optical pump source reaches a maximum before outputs said laser is generated.

7. An erbium laser, comprising:
a laser resonator, said resonator comprising a solid state optical gain medium, said gain medium including erbium as a laser ion; and
an optical pump source that generates a plurality of pulses of optical radiation for pumping said gain medium and producing laser output pulses, the pump pulses having an intensity and duration such that each of the laser output pulses has a full width half maximum (FWHM) of between 0.4 and 3 microseconds, and wherein each of the pulses is separated from an adjacent pulse by a time substantially equal to the time between pump pulses.

8. The erbium laser of claim 7, wherein said laser operates on the $I_{11/2} \rightarrow I_{13/2}$ transition.

9. The erbium laser of claim 8, wherein said laser operates in the wavelength range of 2.5 to 5.0 microns.

10. The erbium laser of claim 9, wherein said solid state medium comprises a material selected from the group consisting of YAG, YLF, YSGG, YALO, and YAP.

11. The erbium laser of claim 9, wherein the laser output pulses from said laser have a wavelength near 2.9 microns.

12. The erbium laser of claim 11, wherein the laser output pulses have a FWHM of between 0.5 and 1 microsecond.

13. The erbium laser of claim 11, wherein the length of said gain medium is less than about 150 mm.

14. The erbium laser of claim 11, said resonator comprising first and second reflectors for providing optical feedback.

15. The erbium laser of claim 9, wherein said gain medium comprises an Er:YAG rod.

16. The erbium laser of claim 9, wherein said optical pump source comprises a flashlamp.

17. The erbium laser of claim 16, wherein a voltage is applied to said flashlamp for a given duration, the voltage and the duration thereof controlling the temporal behavior of the laser output pulses.

18. The erbium laser of claim 8, wherein said optical pump source generates the pump pulses at a repetition rate greater than about 30 Hz.

19. The erbium laser of claim 8, wherein said optical pump source generates the pump pulses at a repetition rate greater than about 50 Hz.

20. The erbium laser of claim 8, wherein said optical pump source generates the pump pulses at a repetition rate greater than about 5 Hz but less than about 100 Hz.

21. A method of generating laser pulses, comprising:
providing a laser resonator that includes a solid state optical gain medium for the wavelength range of 1.9 to 5.0 microns;
pumping the gain medium with pulses of optical radiation to optically excite ions in the gain medium; and
generating optical feedback to create laser output pulses, wherein the intensity and duration of the optical pump pulses is such that the laser output pulses have a full width half maximum (FWHM) of between 0.4 and 3 microseconds, and wherein each of the pulses is separated from an adjacent pulse by a time substantially equal to the time between pump pulses.

22. The method of claim 21, wherein the excited ions include erbium ions.

23. The method of claim 22, wherein the laser operates on the $I_{11/2} \rightarrow I_{13/2}$ transition.

24. A laser, comprising:
a non-Q-switched laser resonator, said resonator comprising a solid state optical gain medium for the wavelength range of 1.9 to 5.0 microns; and
an optical pump source that generates a plurality of pulses of optical radiation for pumping said gain medium and producing laser output pulses, the pump pulses having an intensity and duration such that each of the laser output pulses has a fill width half maximum (FWHM) of between 0.1 and 10 microseconds, and wherein each of the pulses is separated from an adjacent pulse by a time substantially equal to the time between pump pulses.

25. The laser of claim 24, wherein said gain medium includes erbium as a laser ion.

26. The erbium laser of claim 25, wherein said laser operates on the $I_{11/2} \rightarrow I_{13/2}$ transition.

27. The erbium laser of claim 26, in which the FWHM of the laser output pulses is between 0.2 and 0.5 microseconds.

28. The erbium laser of claim 26, in which the FWHM of the laser output pulses is between 0.1 and 0.3 microsecond.

29. An erbium laser, comprising:
a laser resonator, said resonator comprising a solid state optical gain medium for providing optical feedback, said gain medium including erbium as a laser ion; and
an optical pump source that produces a plurality of pulses of optical radiation for pumping said gain medium, the pump pulses having an intensity and duration such that said erbium laser produces laser output pulses having fewer than 10 transverse modes.

30. The erbium laser of claim 29, wherein said laser operates on the $I_{11/2} \rightarrow I_{13/2}$ transition.

31. The erbium laser of claim 30, wherein the laser output pulses have fewer than 5 transverse modes.

32. The erbium laser of claim 29, wherein the laser output pulses have fewer than 5 transverse modes.

33. A method of generating erbium laser pulses, comprising:
providing a laser resonator that includes an optical gain medium for the wavelength range of 1.9 to 5.0 microns;
pumping the gain medium with pulses of optical radiation to optically excite erbium ions in the gain medium; and
generating optical feedback to create laser output pulses, wherein the intensity and duration of the optical pump pulses is such that each of the laser output pulses comprises several dominant spikes having intensities of the same order of magnitude, wherein the number of spikes is no greater than 5, the pulses having a full width half maximum (FWHM) of between 0.4 and 20 microseconds, and wherein each of the pulses is separated from an adjacent pulse by a time substantially equal to the time between pump pulses.

34. The method of claim 33, wherein the erbium ions reside in a host material selected from the group consisting of YAG, YLF, YSGG, YALO, and YAP.

35. The method of claim 34, wherein the laser operates on the $I_{11/2} \rightarrow I_{13/2}$ transition.

36. A non-Q-switched laser producing a series of laser output pulses, comprising:
a laser resonator, said resonator comprising an optical gain medium that includes erbium as a laser ion in a solid state host; and
an optical pump source that produces a plurality of pulses of optical radiation for pumping said gain medium, the pump pulses having an intensity and duration such that each of the pump pulses produces a respective laser output pulse having rise and fall times of 1 microsecond or less, and wherein each of the respective laser output pulses is separated from an adjacent laser output pulse by a time substantially equal to the time between pump pulses.

37. The laser of claim 36, wherein said laser ion is erbium.

38. The laser of claim 37, wherein said laser operates on the $I_{11/2} \rightarrow I_{13/2}$ transition.

39. The laser of claim 38, wherein the laser output pulses have a wavelength of about 3 microns.

* * * * *